US006992027B1

(12) United States Patent
Buckingham et al.

(10) Patent No.: US 6,992,027 B1
(45) Date of Patent: Jan. 31, 2006

(54) COMPOSITE PANEL WITH FIRE RESISTANT FACE SHEETS

(75) Inventors: Mark R. Buckingham, Sawston (GB); F. Dana Blair, Hardwick (GB); Christopher J. E. Harrington, Ware (GB)

(73) Assignee: HEXCEL Composites LTD, Duxford (GB)

( * ) Notice: Subject to any disclaimer, the term of this patent is extended or adjusted under 35 U.S.C. 154(b) by 187 days.

(21) Appl. No.: 10/415,996

(22) PCT Filed: Nov. 13, 2000

(86) PCT No.: PCT/US00/31095

§ 371 (c)(1),
(2), (4) Date: May 5, 2003

(87) PCT Pub. No.: WO02/38381

PCT Pub. Date: May 16, 2002

(51) Int. Cl.
*B32B 9/00* (2006.01)

(52) U.S. Cl. .................... 442/149; 442/136; 442/180; 428/920; 428/921

(58) Field of Classification Search .................. 442/61, 442/65–67, 136, 149; 428/141, 142, 920, 428/921
See application file for complete search history.

(56) References Cited

U.S. PATENT DOCUMENTS

| 4,557,961 A | 12/1985 | Gorges |
| 4,600,634 A | 7/1986 | Langer |
| 5,798,307 A | 8/1998 | Davidovits et al. |
| 6,511,730 B1 * | 1/2003 | Blair et al. .................... 428/73 |

FOREIGN PATENT DOCUMENTS

| EP | 0568270 A | 11/1993 |
| WO | WO 84/04727 A | 12/1984 |
| WO | WO 93/19129 | 9/1993 |
| WO | WO 96/28398 A | 9/1996 |
| WO | WO 99/24682 A | 5/1999 |
| WO | WO 00/73055 A | 12/2000 |

OTHER PUBLICATIONS

"Fire Proof Mica Coverings" COGEBI Mica Insulating Products, Undated.
Fire and Materials, vol. 21, pp. 67-73 (1997).

* cited by examiner

*Primary Examiner*—Terrel Morris
*Assistant Examiner*—A B Sperty
(74) *Attorney, Agent, or Firm*—W. Mark Bielawski; David J. Oldenkamp

(57) ABSTRACT

A fire resistant laminate for application to a core structure (12) to form a sandwich panel (10) having fire resistant face sheets (14 & 16). The laminate includes a fire protection (18) in which at least one layer of fibers (22) is embedded within a cured inorganic polymer matrix (24). The laminate further includes an adhesive layer (20) for bonding to the core structure.

13 Claims, 2 Drawing Sheets

COMPOSITE PANEL WITH FIRE RESISTANT FACE SHEETS

BACKGROUND OF THE INVENTION

1. Field of the Invention

The present invention relates generally to composite sandwich panels which are used in aerospace and other applications where light weight and high strength are required. More particularly, the present invention is directed to composite sandwich panels which are designed for use in an environment where flame resistance and/or fire protection is required.

2. Description of Related Art

Composite sandwich panels are widely used in aerospace and other industries where structures are required that are light weight and strong. The sandwich panels typically include a light weight central core structure which is sandwiched between two composite face sheets. The face sheets are adhesively bonded to the core. Various core structures are presently in use with the two main types being rigid foam and honeycomb. Rigid foam cores are advantageous because the face sheets contact the foam over a relatively large surface area which insures a strong bond. In many foam cores, the core will fracture before the adhesive bond between the face sheets and the core fails. Some disadvantages of rigid foam core are that light weight rigid foam is not particularly strong and the fire or flame resistance of many foams is not particularly good.

Honeycomb provides a number of advantages over rigid foam cores. Honeycomb cores, in general, provide much greater strength than rigid foam cores having the same density. One drawback of a honeycomb core is that the surface area which is available for bonding to the face sheets is much smaller than for foam cores. The honeycomb cells extend transversely between the face sheets so that the only surface available for bonding to the face sheets is the outer edges of the cells. As a result, the overall strength of the majority of honeycomb panels is significantly affected by the strength of the bond between the face sheets and the honeycomb.

Epoxy-based adhesives have been used to bond face sheets to honeycomb cores where the structural strength of the panel is important. For example, honeycomb sandwich panels used for aircraft flooring and other high stress structures have typically utilized epoxy-based adhesives to bond the face sheets to the honeycomb core. Epoxy-based adhesives tend to burn relatively easily and produce large amounts of smoke. Attempts have been made to increase the fire resistance of epoxy adhesives by halogenating the adhesives. However, these attempts have not been entirely successful.

Phenolic adhesives are inherently more fire resistant than epoxy adhesives. However, phenolic resins do not have the same strong adhesive properties found in epoxy resins. As a result, phenolic adhesives have been limited to use in honeycomb sandwich panels which are not structural in nature. Such panels include aircraft interior side walls, ceilings and overhead bins. It was found that certain configurations and combination of phenolic resins and fire protection agents provide low flame, smoke and toxicity (FST) panels which have structural strengths which are equivalent to prior panels using epoxy-based adhesives. This discovery is set forth in PCT Application No. US00/06609 which is owned by the same assignee as the present invention.

In many situations, the flame/heat resistance of a composite panel is of primary importance. Making such flame/heat resistant panels is particularly problematic when the central core is made from low heat resistant materials such as NOMEX® (aramid paper) or cellulose-based resin impregnated fibers. One approach for thermally protecting such cores is to make the face sheets resistant to flame and heat. Exemplary composite panels which include flame/heat protective face sheets are disclosed in U.S. Pat. Nos. 4,557,961; 4,299,872; 4,598,007;5,309,690; and 4,037,751. The face sheets described in these patents utilize an organic polymer resin matrix which includes one or more intumescent materials.

Heat resistant composite panels have also been made where the face sheets utilize an inorganic resin matrix. For example, U.S. Pat. No. 5,798,307 discloses the preparation of a composite panel in which a NOMEX® core is sandwiched between two face sheets composed of carbon fiber fabric impregnated with an alkali alumino-silicate geopolymeric matrix. In the patent disclosure, no separate adhesive is used to bond the face sheets to the core. Instead, as is known in the art, the uncured face sheets are applied directly to the core and cured (hardened) in place. As a result, the geopolymeric matrix acts as the adhesive.

SUMMARY OF THE INVENTION

In accordance with the present invention, it was discovered that direct application of inorganic polymers, including the above-described alkali alumino-silicate geopolymers, to honeycomb cores without prior curing causes a number of problems. Most significantly, curing of such inorganic polymers generates moisture which in many instances damages the honeycomb core. This is especially true for aramid-based core materials. Further, the adhesion between such inorganic polymers and honeycomb cores was found to be poor. It was further discovered that the above problems could be avoided by first curing the inorganic polymer matrix and then applying an adhesive to the cured face sheet to form a laminate which can be bonded securely to the honeycomb core. It was suprisingly discovered that a separate adhesive layer could be added to increase adhesion of the face sheets without adversely affecting the flame/heat resistance of the panel which is obtained when using face sheets that incorporate the inorganic polymer matrix alone.

As a feature of the present invention, it was discovered that structurally strong composite sandwich panels can be made utilizing fibers in the face sheets which are embedded in an inorganic polymer matrix. It was found that inorganic polymer resins could be used in combination with suitable fibers to form face sheets which are bonded to a suitable core using an adhesive layer to provide panels which exhibit an exceptional combination of peel resistance and fire performance. It is the combination which is exceptional, rather than the value of either property taken alone.

The present invention is based on a fire resistant laminate which can be applied to a core structure to form a sandwich panel having fire resistant face sheets. The fire resistant laminate includes a fire protection layer which has an inner surface and an outer surface. The fire protection layer includes at least one layer of fibers which are embedded in a cured inorganic polymer matrix. The fire protection layer further includes an inner layer which is composed of at least a portion of the fiber layer and a sufficient amount of inorganic polymer matrix to provide an adhesive surface. This adhesive surface forms the inner surface of the fire protection layer. The adhesive surface itself is not necessarily sticky. Rather, the term "adhesive" is used in this context to connote that the surface is an "easily adhered to" or "easily bonded to" surface. The laminate also includes an adhesive layer which is applied to the adhesive surface of the fire protection layer. The adhesive layer, with the attached fire protection layer, is applied directly to the face of the core structure to form the composite panel.

The present invention covers fire resistant laminates which include a single fiber layer or multiple fire layers. In either case, the inner layer of the fire protection layer includes fibers which are embedded in the inorganic polymer matrix to form an adhesive surface to which the adhesive layer is applied. The present invention also is directed to sandwich panels which utilize the fire resistant laminates in accordance with the present invention on either one or both faces of the sandwich core.

The present invention is particularly well-suited for use in transport, especially the aerospace industry where composite laminates and panels must meet certain requirements for weight, strength, flammability, smoke and toxicity.

The above discussed and many other features and attendant advantages of the present invention will become better understood by reference to the following detailed description when taken in conjunction with the accompanying drawings.

DETAILED DESCRIPTION THE INVENTION

Figure 1:
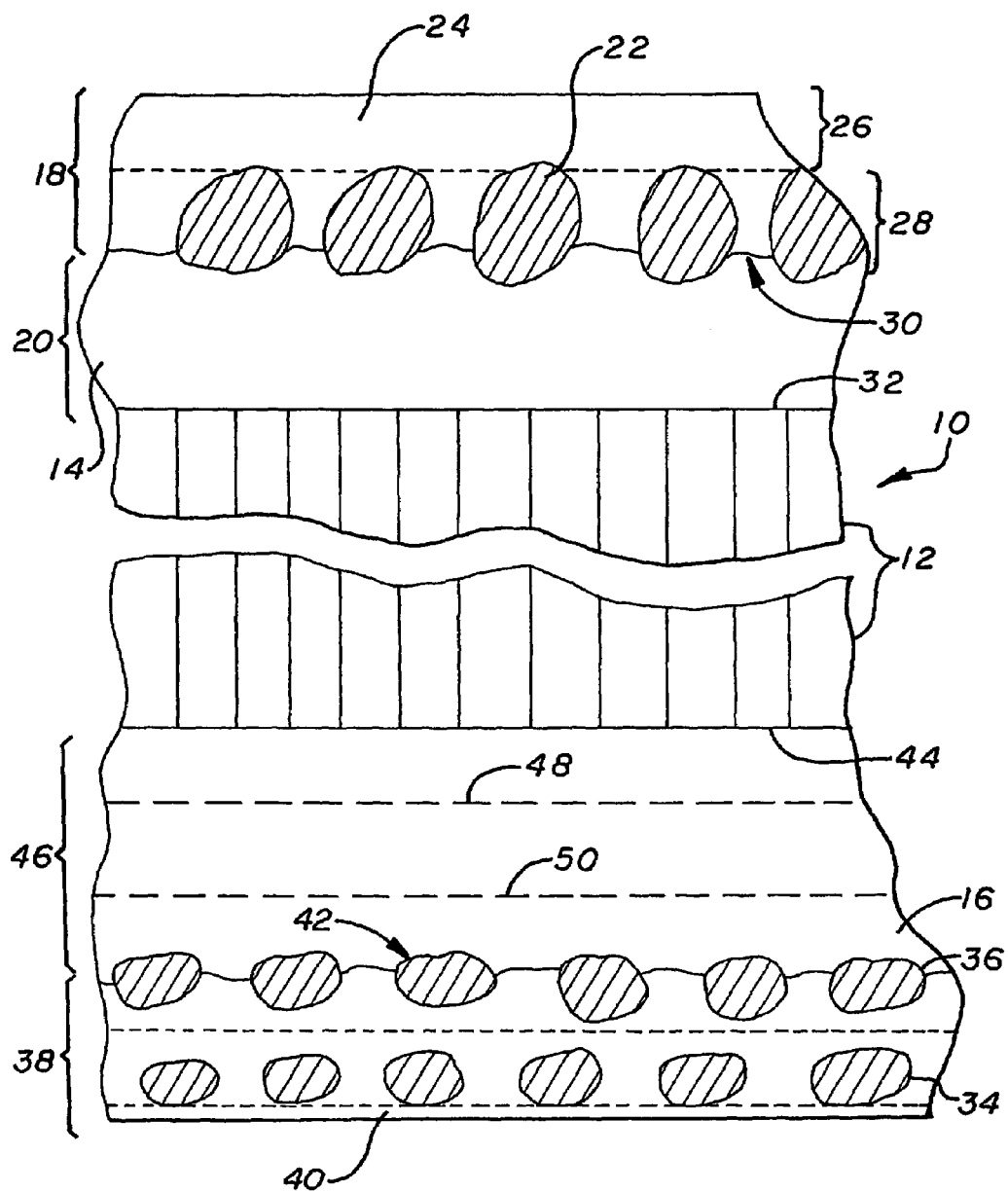
FIG. 1 is a schematic representation of an exemplary honeycomb composite sandwich panel in accordance with the present invention wherein a one-ply fire protection layer is attached to one side of the honeycomb core with an adhesive layer (see top of FIG. 1) and a two-ply fire protection layer with an adhesive layer attached to the other side (see bottom of FIG. 1).

A composite sandwich panel in accordance with the present invention is shown diagrammatically at 10 in FIG. 1. The sandwich panel 10 includes a honeycomb core structure 12. Other core structure materials are possible including rigid foam and other lightweight materials commonly used in sandwich panels. However, the preferred core structure is honeycomb and the following detailed description will be limited to a description of the present invention as it applies to sandwich panels employing honeycomb cores. The honeycomb core 12 can be any of the common honeycomb materials used in sandwich panels.

The honeycomb 12 may be made from aluminum or other lightweight metal. The invention is especially well suited for use with honeycombs made from various composite materials which are less heat resistant than metal-based honeycomb. Exemplary honeycomb materials include aramid paper cores, calendared kraft paper core including blends and glassine materials, flame retardant phenolic foam cores and metallic cores including aluminum foam filled cores. The core may include coatings which are applied by dipping the core in an appropriate coating solution as is known in the art. Coatings may be applied to the core by other techniques, such as spraying, if desired. Phenolics and geopolymers are exemplary coating materials. Although any number of honeycomb configurations are possible, the preferred honeycomb configuration employs hexagonally shaped cells. The wall thicknesses of the honeycomb cells may be varied to obtain the desired honeycomb core strength. Preferred honeycomb materials for use in accordance with the present invention are made from aramid-based materials such as the material marketed under the tradename NOMEX® which is available from Dupont Chemical Co., Wilmington, Del. Another suitable honeycomb material is kraft paper. Kraft paper is a cellulose-based material.

Particularly preferred core materials are NOMEX® or cellulose-based materials, such as kraft paper, which have been coated with an inorganic polymer. Preferred inorganic polymers include geopolymers based on alumino-silicates. NOMEX® cores coated with alkali alumino-silicate geopolymers are particularly preferred. The inorganic polymer coatings are applied to the core surface using any of the known technologies including spraying and dipping. The viscosity of the polymer must be controlled to provide a uniform coating on the core surfaces without plugging the honeycomb cell openings. Viscosity of the polymer is easily controlled by varying the solvent (e.g. water) concentration to achieve the desired flow characteristics.

Referring again to FIG. 1, the composite sandwich panel 10 includes two face sheets shown at 14 and 16, respectively. In the preferred embodiment, the sandwich panel will include face sheets on both sides of the honeycomb core. However, the present invention does contemplate situations where only one face sheet is utilized. In such situations, the honeycomb core may require only one face sheet or may be located adjacent to a structural member or other element wherein the use of a second face sheet is not required. For exemplary purposes, all of the sandwich panels discussed herein will include a face sheet on both sides of the core.

The face sheets 14 and 16 may be identical or they may have different configurations. For the purpose of aiding in description of the invention, face sheets 14 and 16 will be described as having different configurations. However, it will be understood that in a preferred embodiment, both face sheets will have the same configuration.

Referring first to face sheet 14, the face sheet includes a fire protection layer 18 which is bonded to the honeycomb core 12 by adhesive layer 20. The fire protection layer 18 includes a single fiber layer 22 which is preferably asymmetrically embedded in an inorganic polymer, such as a cured alkali alumino-silicate geopolymeric matrix 24. The fiber layer 22 is embedded such that an outer fire barrier layer 26 is formed which is composed essentially of the alkali alumino-silicate geopolymeric matrix 24. The outer fire barrier 26 may range in thickness from less than a few microns to a few centimeters or more. In situations where weight is critical, the outer fire barrier 26 may be no more than a thin exterior polymer coating on fibers 22.

The fire protection layer 18 further includes an inner layer 28 in which the fiber layer 22 and alkali alumino-silicate geopolymeric matrix 24 provide an adhesive surface 30. It is preferred that the adhesive surface 30 be a textured surface which is formed by the surfaces of the fiber layer 22 and geopolymeric matrix. The textured surface 30 is especially well-suited for providing adhesion between the fire protection layer 18 and the honeycomb core face 32. This adhesion is provided by way of adhesive layer 20. The texture of the adhesive surface 30 will be in large part determined by the size, shape and weave pattern of the underlying fiber layer. The particular texture pattern can be varied as desired to achieve optimum levels of bonding. Generally, the fabric is chosen and the inorganic polymer resin is applied to maximize the surface area of the adhesive surface 30 which is available for bonding. In addition, the amount of inorganic polymer used to impregnate the fabric layer 22 can be limited so that some of the fibers on adhesive surface 30 are not coated with inorganic polymer. In this way, portions of the adhesive surface 30 will include exposed fiber surfaces which are bonded directly to the adhesive layer. The amount of exposed (i.e., uncoated) fiber on adhesive surface 30 may be varied to achieve optimum adhesive bonding of the laminate to the honeycomb core. In general, the amount of exposed fiber surface area as a percentage of the total adhesive surface 30 may range from 0 up to 90 percent. Preferably, the exposed fiber surface area will be in a range 10–60 percent of the total adhesive surface 30.

The face sheet shown at 16 in FIG. 1 is a preferred fire resistant laminate. The face sheet 16 includes two fiber layers 34 and 36 which are asymmetrically embedded in the alkali alumino-silicate geopolymeric matrix 24 to form fire protection layer 38. In the same manner as face sheet 14, the fire protection layer 38 includes outer fire barrier 40 and textured surface 42. The fire protection layer 38 is bonded to face 44 of honeycomb 12 by way of adhesive layer 46. As represented by phantom lines 48 and 50, the adhesive layer 46 may be made up of three individual layers of adhesive which are applied to form a single adhesive layer 46.

Figure 2:
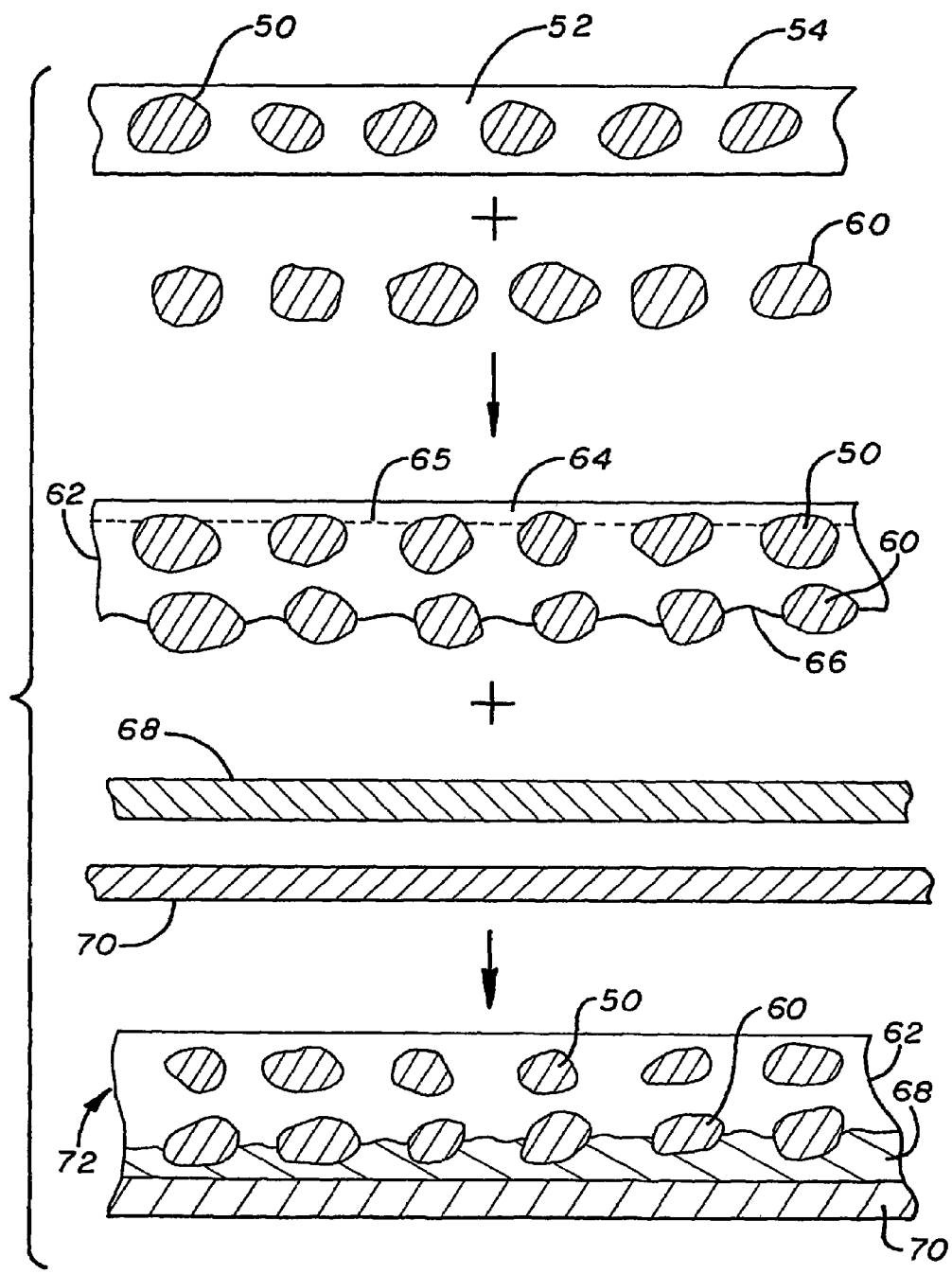
FIG. 2 is a diagrammatic representation of the formation of a fire-resistant laminate in accordance with the present invention which includes a two-ply fire protection layer and an adhesive layer.

A preferred exemplary process for making a fire resistant laminate in accordance with the present invention is shown diagrammatically in FIG. 2. The exemplary method shown in FIG. 2 is for preparing a two-fiber layer (i.e. two ply) laminate. It will be understood by those skilled in the art that the same basic procedure applies for making fire resistant laminates having more than two fiber layers. Initially, a fiber layer 50 is impregnated with a sufficient amount of alkali alumino-silicate geopolymeric or other inorganic polymer resin 52 to form a laminate 54 which is completely saturated with resin.

The saturated laminate 54 is then applied to a second layer of fibers 60 to form an uncured laminate 62 which has an outer fire barrier layer 64 and an inner layer having textured adhesive surface 66. The fire barrier layer 64 has a lower boundary as shown by phantom line 65. As previously mentioned, the thickness of fire barrier layer 64 may be less than a few microns up to a few centimeters or more. The thickness of the fire barrier 64 can be varied to achieve different levels of fire resistance. The laminate 62 is cured to form a cured alkali alumino-silicate geopolymeric or other cured inorganic polymer matrix in which fiber layers 50 and 60 are asymmetrically embedded. As shown in FIG. 2, approximately 50 percent of the adhesive surface 66 is composed of exposed fibers 60. Alternatively, the fibers 60 may be completely embedded in resin 52 to form a smooth surface or lesser amounts of resin may be used to achieve varying degrees of texturing.

Adhesive layers 68 and 70 are then applied to the textured surface 66 in order to form the final fire resistant laminate shown at 72 which is ready for application to a suitable honeycomb core. The laminate 62 should be cured completely prior to application of the adhesive layers 68 and 70. It was found that moisture which may be produced during curing of the inorganic polymers can adversely affect the adhesive layers. Further, the temperatures (180° C. and higher) required to cure some inorganic polymers are much higher than the temperatures used for curing adhesive polymers. According, co-curing of the inorganic polymer matrix and the adhesive polymer should be avoided.

The amount of resin 52 which is initially applied to fiber layer 50 is chosen such that when the second layer 60 is applied to the first laminate, there is sufficient resin present to only partially impregnate fiber layer 60. The partial impregnation of fiber layer 60 results in the formation of a textured surface as shown at 66. As previously mentioned, it is this textured surface of partially exposed fibers which is believed to enhance the adhesion and peel strength between the face sheet and core material. The textured surface may have varying degrees of texture depending upon the particular fabric being used and the amount of fabric surface which is exposed. The exposed fibers may be completely "dry" or they may be coated with a thin layer of resin. The amount of "dry" versus coated exposed fibers may be varied to achieve optimum adhesion.

The adhesives which may be used to form the adhesive layer include any of the conventional adhesives used to adhere face sheets to core structures. Epoxy-based adhesives and phenolic adhesives may be used. Phenolic adhesives are preferred. Suitable exemplary adhesives include phenolic resole resins with dissolved polyurethane, such as ESTATE (B.F. Goodrich Specialty Plastics, Cleveland, Ohio) or BUTVAR (Solutia Inc., St. Louis, Mo.) which is polyvinyl butyral which can be dissolved in phenolic resole. Another suitable adhesive is a phenolic resole resin toughened with a silicone-based modifier such as GP790D62 available from Georgia Pacific (Atlanta, Ga.). Phenolic resole resins with other compatible thermoplastics are also suitable.

Suitable inorganic polymer matrix materials include geopolymeric resins and also silico-aluminates comprising fluorine and an alkali metal or alkaline earth metal, e.g. alkaline fluoro-sodium poly(sialate-disiloxo), fluoro-potassium poly(sialate-disiloxi), and fluoro-calcium poly(sialate-disiloxi) compositions. The fluorine containing compositions are described for example in PCT Publication No. WO 93/19129. Exemplary geopolymeric resins are described in U.S. Pat. No. 5,798,307. Alkali alumino-silicate geopolymeric resins are preferred. These resins are described in detail in U.S. Pat. No. 5,798,307.

Suitable alkali alumino-silicate geopolymeric materials include those compositions which, after dehydration, have the formula:

$$yM_2O:Al_2O_3:xSiO_2$$

where x is a value lying between 6.5 and 70, y is a value lying between 0.95 and 9.50, and M is either Na, K or a mixture of Na and K. Preferred materials are potassium, alumino-silicate geopolymeric matrices as described in "Fire and Materials," Vol. 21, pgs. 67–73 (1997). Particularly preferred resins are those having the formula $Si_{32}O_{99}H_{24}K_7Al$.

The fiber layers used to form the laminates may be woven, unidirectional or random. Any of the fabric materials typically used to form sandwich panels may be used. Preferred fiber materials include alkali resistant glass fibers, carbon fibers, ceramic fibers, organic fibers, metal mesh, thermoplastics with the thermal stability to form stable reinforcement and other reinforcing materials known in the art.

Examples of practice are as follows:

Preparation of Inorganic Resin

A water based 'geopolymer' resin dispersion was obtained by mixing the following components in a glass flask over ice.

| | | |
|---|---|---|
| GP102A | 338.4 g | (potassium silicate solution) |
| Sulveol LN | 4.0 g | (wetting agent) |
| GPS32B | 457.6 g | (aluminosilica powder) |

Raw materials were obtained from Geopolymere SA, France.

The above geopolymer resin dispersion was stored in a freezer at approximately −20°.

Preparation of Inorganic Resin/Carbon Fabric Skins 41.1 g of the above geopolymer resin dispersion was poured onto a piece of G803 carbon fabric 300×350 mm (weight 300 grams per square meter) and spread with a coating bar to impregnate the fabric with the resin uniformly. The fabric was turned over and another 41.1 g of resin as spread onto the other side of the fabric in the same way. A dry piece of G803 fabric cut to the same size was placed on top of the resin-impregnated fabric. G803' fabric is available from Hexcel Corp. (Duxford, England).

These two pieces of fabric were then cured in a hot press at 80° C. for 30 minutes and then 130° C. for 90 minutes, with the dry fabric on top of the resin impregnated fabric. The resulting cured 'skin' consisted of two layers of impregnated fabric bonded together by the inorganic resin. Additional cured skins were prepared and cured in the same way.

The upper and lower faces of these skins were labeled. The lower face (with the piece of impregnated fabric at the surface) was shiny in appearance, with a continuous film of inorganic resin on the fabric which formed the fire barrier layer. The upper face (with the piece of previously dry fabric at the surface) formed the textured surface which was mat in appearance. The resin had only partially impregnated the previously dry fabric so that unimpregnated dry fibers were left at the surface. Although no specific measurements of degree of impregnation or percentage dry fibers were made, the quantity of resin used was calculated to give approximately 50% impregnation of the upper fabric, and so leave around 50% of the total surface of the upper face as dry fibers.

The cured skins where then dried for approximately 16 hours at 80° C.

Preparation of Sandwich Panels

A film of phenolic adhesive was prepared as follows. Phenolic lacquer identified as "BSL840", available from VANTICO (Duxford, England), was coated onto silicone release paper and dried to give an adhesive film with a coating weight of 60 grams per square meter (gsm).

One, two or three layers of adhesive film on silicone release paper were applied to the upper (partially impregnated) face of the cured and dried skins prepared as above. Impregnation of the adhesive into the skins was achieved by applying a hot iron to the backing paper. The paper was then removed before applying the next layer of adhesive in the same way. In this way, skins with adhesive on one face were prepared.

A piece of 9.6 mm thick honeycomb core was cut to the same size as the skins and dried for 1 hour at 140° C. The honeycomb was a phenolic dipped NOMEX material which is available from Hexcel Corp. (Duxford, England) under the commercial name A1-80-3. A sandwich panel was prepared by applying one face of the core to the adhesive coated side of one skin, and the other face of the core to the adhesive coated side a second skin. This panel was heated at 130° C. for 60 minutes in a hot press to cure the adhesive layers. After curing, the skins (with shiny resin surfaces outermost) were firmly bonded to the core.

The above described procedure was used to prepare four panels as follows:

Panel A with 60 gsm (1 layer) adhesive applied to each of the two skins

Panels B and C with 120 gsm (2 layers) adhesive applied to each of the two skins Panel D with 180 gsm adhesive (3 layers) applied to each of the two skins Evaluation of Climbing Drum Peel Adhesion Panels A, B and D were subjected to the climbing drum peel test for adhesives as described in ASTM designation D1781-76 (re-approved 1986). This test measures the strength of the bond between the face sheet and the core structure. The results are shown below:

| Panel | Adhesive Weight BSL 840 (gsm) | Peel Strength CDP (N/76 mm) |
| --- | --- | --- |
| A | 60 | 60 |
| B | 120 | 190 |
| D | 180 | 330 |

Panels B and D with at least 120 gsm adhesive had adhesion values of >130 N/76 mm. A similar panel prepared without using an adhesive layer between the skins and the core, and with the skins applied to the core before curing the skins showed poorer adhesion than any of the panels above. Accordingly, it is preferred that the laminates be cured before being bonded to the core. If no adhesive layer is used, and the skins are cured before applying them to the core, there is no adhesion between the skins and the core.

Evaluation of OSU Heat Release Rate:

Panel C (with 120 gsm BSL 840 adhesive) was subjected to the Ohio State University (OSU) heat release test. The Ohio State University (OSU) heat release test is described in "Heat Release in Fires" edited by B. Babraushkas and S. J. Grayson; El Sevier Applied Science, Pages 13–17, first edition, 1992. This heat release test measures the heat released for the duration of the test from the moment the specimen is inserted into a controlled exposure chamber and encompasses the period of ignition and progressive flame involvement of the surface of the specimen. The measurement tests peak heat release rate and total heat release rate. The OSU test results are expressed as Peak Heat Release Rate/Total Heat Release Rate for a 2-minute period (Peak HRR/Total HRR, 2 min.). Peak HRR is expressed as $kW/m^2$ and Total HRR is expressed as $kWmin/m^2$. The units are usually dropped from the OSU test results so that they are typically expressed simply as a number ratio (e.g. 20/20). A legal requirement of current aircraft regulations is a maximum level for OSU of 65/65. The average values of two OSU heat release tests on Panel C were as follows:

$6.4$ $kW/m^2$ peak heat release rate $3.5$ $kW.min/m^2$ mean heat release rate over first two minutes of test As discussed above, these test results are expressed as an OSU heat release value of 6.4/3.5 which is significantly and unexpectedly far below the OSU Standard of 65/65.

The OSU heat release value for Panel C is surprisingly low for a panel with a combustible phenolic adhesive and Nomex core. The carbon fiber reinforced inorganic resin surface layers of the panel act as an effective fire barrier to protect the combustible materials inside the panel. During the 5 minute timescale of the OSU heat release test, the oxidation of the carbon fibers does not appear to contribute significantly to the heat release of the panel. Thus, panels of this invention prepared with 120 gsm adhesive have OSU heat release values <10/10 units and CDP >130 N/76 nm.

Having thus described exemplary embodiments of the present invention, it should be noted by those skilled in the art that the within disclosures are exemplary only and that various other alternatives, adaptations and modifications may be made within the scope of the present invention.

Accordingly, the present invention is not limited to the above preferred embodiments, but is only limited by the following claims.

What is claimed is:

1. A fire resistant laminate comprising:
   (A) a fire protection layer comprising an inner surface and an outer surface, said fire protection layer comprising fibers and a cured inorganic polymer; and
   (B) an adhesive layer comprising an uncured phenolic adhesive which has been applied to said inner surface of said fire protection layer.

2. A Fire resistant laminate according to claim 1 wherein at least a portion of said fibers are located at said inner surface to provide an inner surface which is textured by said fibers.

3. A fire resistant laminate according to claim 2 wherein said inner surface of said fire protection layer comprises exposed fibers which consist essentially of fibers that are not coated with said cured inorganic polymer.

4. A fire resistant laminate according to claim 1 wherein said cured inorganic polymer is an alkali aluminosilicate geopolymer.

5. A fire resistant laminate according to claim 1 wherein said cured alkali aluminosilicate geopolymeric matrix comprises a composition after dehydration having the formula:

$$yM_2O:Al_2O_3:xSiO_2$$

where x is a value lying between 6.5 and 70, y is a value lying between 0.95 and 9.50 and M is either Na, K or a mixture of Na and K.

6. A fire resistant laminate according to claim 1 wherein said fibers are selected from the group consisting of graphite fibers, ceramic fibers and glass fibers.

7. A fire resistant laminate according to claim 1 wherein said fibers comprise at least two layers of fibers.

8. A method for making a fire resistant laminate comprising the steps of:
   (A) providing a fire protection layer comprising an inner surface and an outer surface, said fire protection layer comprising fibers and a cured inorganic polymer; and
   (B) applying an uncured phenolic adhesive layer to said inner surface of said fire protection layer.

9. A method for making a fire resistant laminate according to claim 8 wherein at least a portion of said fibers are located at said inner surface to provide an inner surface which is textured by said fibers.

10. A method for making a fire resistant laminate according to claim 9 wherein said inner surface of said fire protection layer comprises exposed fibers which consist essentially of fibers that are not coated with said cured inorganic polymer.

11. A method for making a fire resistant laminate according to claim 8 wherein said cured inorganic polymer is an alkali aluminosilicate geopolymer.

12. A method for preparing a fire resistant laminate according to claim 11 wherein said cured alkali aluminosilicate geopolymeric matrix comprises a composition after dehydration having the formula:

$$yM_2O:Al_2O_3:xSiO_2$$

where x is a value lying between 6.5 and 70, y is a value lying between 0.95 and 9.50 and M is either Na, K or a mixture of Na and K.

13. A method for making a fire resistant laminate according to claim 8 wherein said fibers are selected from the group consisting of graphite fibers, ceramic fibers and glass fibers.

* * * * *